(12) United States Patent
Pongracz et al.

(10) Patent No.: US 10,305,798 B2
(45) Date of Patent: May 28, 2019

(54) DYNAMIC LOOKUP OPTIMIZATION FOR PACKET CLASSIFICATION

(71) Applicant: Telefonaktiebolaget LM Ericsson (publ), Stockholm (SE)

(72) Inventors: Gergely Pongracz, Budapest (HU); Gabor Sandor Enyedi, Budapest (HU); Laszlo Molnar, Budapest (HU); Zoltan Lajos Kis, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 129 days.

(21) Appl. No.: 15/188,930

(22) Filed: Jun. 21, 2016

(65) Prior Publication Data
US 2017/0366455 A1 Dec. 21, 2017

(51) Int. Cl.
  *H04L 29/08* (2006.01)
  *H04L 12/741* (2013.01)
  *H04L 12/721* (2013.01)
  *H04L 12/911* (2013.01)

(52) U.S. Cl.
  CPC ............ *H04L 45/74* (2013.01); *H04L 45/66* (2013.01); *H04L 45/745* (2013.01); *H04L 47/82* (2013.01); *H04L 69/324* (2013.01)

(58) Field of Classification Search
  CPC ...................................... H04L 45/74
  USPC ........................................ 370/392
  See application file for complete search history.

(56) References Cited

U.S. PATENT DOCUMENTS

2002/0052782 A1* 5/2002 Landesmann .......... G06Q 20/20
                                                          705/14.2

FOREIGN PATENT DOCUMENTS

WO    2016005924 A1    1/2016

OTHER PUBLICATIONS

Open Networking Foundation, "OpenFlow Switch Specification," Version 1.5.1 (Protocol version 0x06), ONF TS-025, Mar. 26, 2015, 283 pages.

* cited by examiner

*Primary Examiner* — Shripal K Khajuria
(74) *Attorney, Agent, or Firm* — Nicholson De Vos Webster & Elliott LLP

(57) ABSTRACT

A method is implemented by a network device to dynamically optimize lookup speed in a packet processing table maintained at the network device while the network device is in operation. The method includes determining one or more runtime metrics of the packet processing table, selecting a lookup algorithm for the packet processing table from a set of lookup algorithms supported by the network device based on the one or more runtime metrics of the packet processing table, and configuring the network device to match incoming packets against rules in the packet processing table using the selected lookup algorithm for the packet processing table.

20 Claims, 6 Drawing Sheets

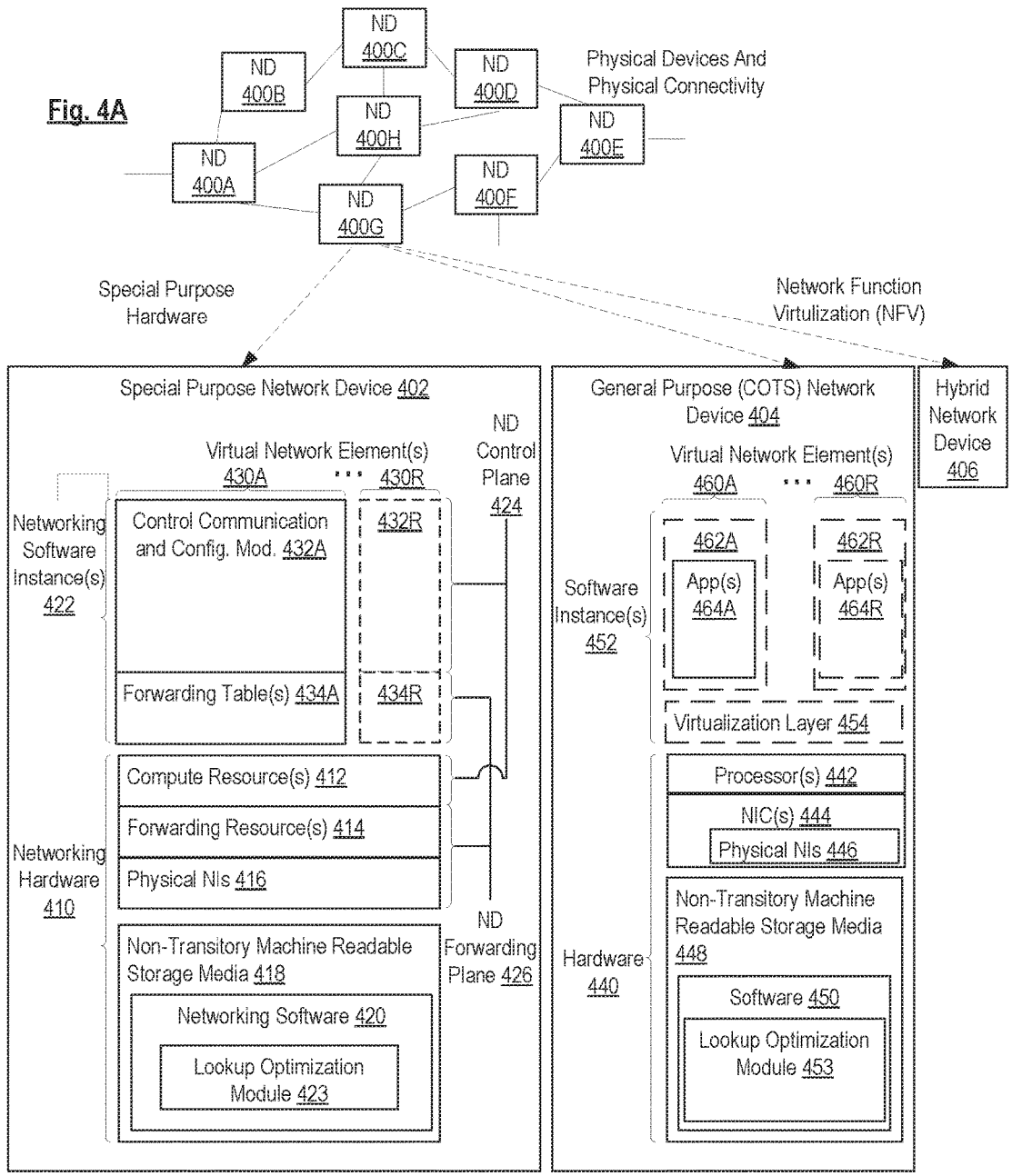

DYNAMIC LOOKUP OPTIMIZATION FOR PACKET CLASSIFICATION

TECHNICAL FIELD

Embodiments of the invention relate to the field of packet networks, and more specifically, to dynamically optimizing lookup speed in a packet processing table.

BACKGROUND

Software Defined Networking (SDN) is an approach to computer networking that employs a split architecture network in which the forwarding (data) plane is decoupled from the control plane. The use of a split architecture network simplifies the network devices (e.g., switches) implementing the forwarding plane by shifting the intelligence of the network into one or more controllers that oversee the switches. SDN facilitates rapid and open innovation at the network layer by providing a programmable network infrastructure. OpenFlow is a protocol that enables controllers and switches in an SDN network to communicate with each other. OpenFlow enables dynamic programming of flow control policies in the network.

A packet processing device such as a switch (e.g., OpenFlow switch) may include one or more packet processing tables (e.g., flow tables) that each include one or more rules (e.g., flow entries) for specifying how the switch should process incoming packets. Each rule may include one or more match fields that are used to match packets and one or more actions to apply to packets that match the rule.

A switch may use a lookup algorithm to match packets against rules in a packet processing table to find a matching rule. Currently, the OpenFlow standard does not specify the lookup algorithm that a switch should use to match packets against rules in a packet processing table. Most switches match packets using a hash-based lookup algorithm or a linear search lookup algorithm.

Sophisticated switches (e.g., OpenFlow switches) typically implement multiple diverse functionalities such as Media Access Control (MAC) learning, routing, and firewall functionality, with each of these functionalities implementing different packet processing tables containing different types of rules and different number of rules. Different types of lookup algorithms may have different lookup speeds when matching packets against rules in a packet processing table depending on the population of the packet processing tables. However, switches typically do not have a-priori information regarding the population of packet processing tables, and thus often resort to using a single generic lookup algorithm for all packet processing tables, which may result in suboptimal performance.

SUMMARY

A method is implemented by a network device to dynamically optimize lookup speed in a packet processing table maintained at the network device while the network device is in operation. The method includes determining one or more runtime metrics of the packet processing table, selecting a lookup algorithm for the packet processing table from a set of lookup algorithms supported by the network device based on the one or more runtime metrics of the packet processing table, and configuring the network device to match incoming packets against rules in the packet processing table using the selected lookup algorithm for the packet processing table.

A network device is configured to dynamically optimize lookup speed in a packet processing table maintained at the network device while the network device is in operation. The network device includes a set of one or more processors and a non-transitory machine-readable storage medium having stored therein a lookup optimization module. The lookup optimization module, when executed by the set of one or more processors, causes the network device to determine one or more runtime metrics of the packet processing table, select a lookup algorithm for the packet processing table from a set of lookup algorithms supported by the network device based on the one or more runtime metrics of the packet processing table, and configure the network device to match incoming packets against rules in the packet processing table using the selected lookup algorithm for the packet processing table.

A non-transitory machine-readable medium has computer code stored therein, which when executed by a set of one or more processors of a network device, causes the network device to perform operations for dynamically optimizing lookup speed in a packet processing table maintained at the network device while the network device is in operation. The operations include determining one or more runtime metrics of the packet processing table, selecting a lookup algorithm for the packet processing table from a set of lookup algorithms supported by the network device based on the one or more runtime metrics of the packet processing table, and configuring the network device to match incoming packets against rules in the packet processing table using the selected lookup algorithm for the packet processing table.

BRIEF DESCRIPTION OF THE DRAWINGS

The invention may best be understood by referring to the following description and accompanying drawings that are used to illustrate embodiments of the invention. In the drawings:

FIG. 4A illustrates connectivity between network devices (NDs) within an exemplary network, as well as three exemplary implementations of the NDs, according to some embodiments.

FIG. 4B illustrates an exemplary way to implement a special-purpose network device, according to some embodiments.

DETAILED DESCRIPTION

Figure 1:
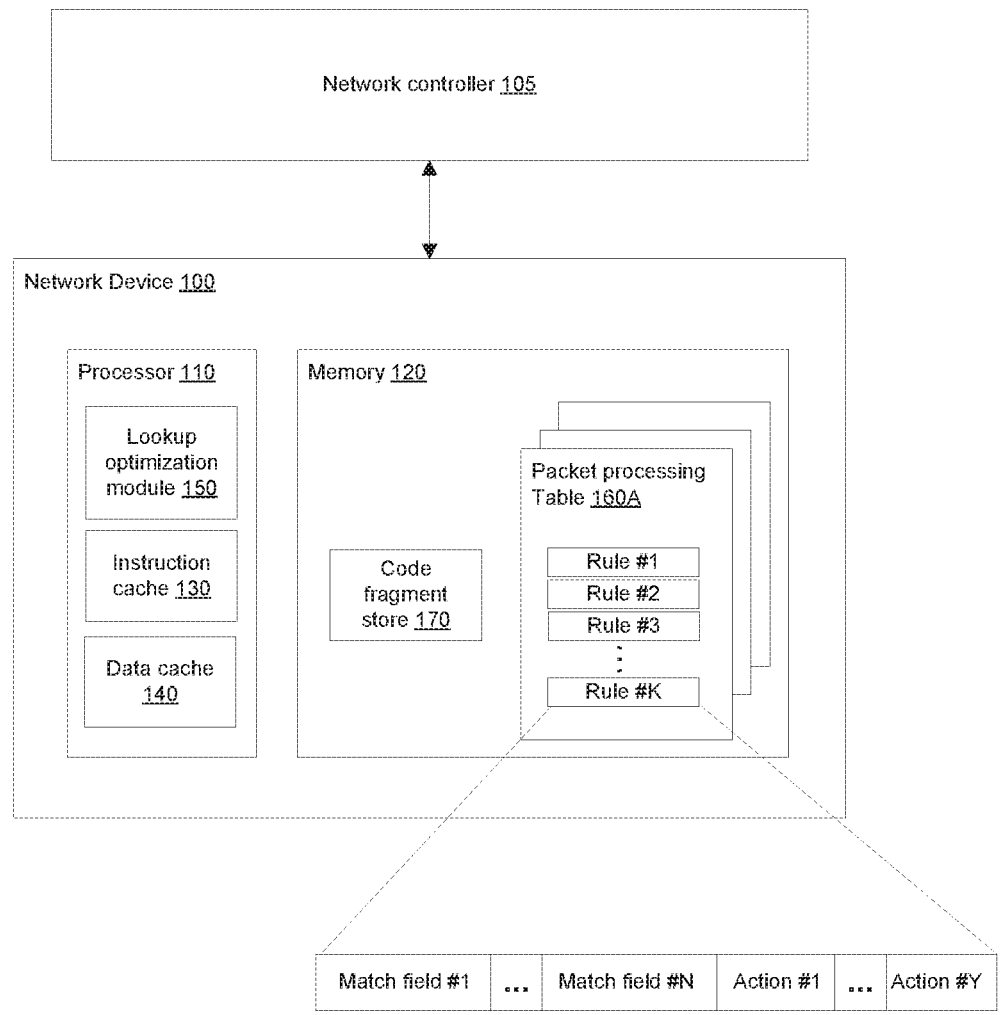
FIG. 1 is a block diagram of a network device that is configured to dynamically optimize lookup speed, according to some embodiments.

The following description describes methods and apparatus for dynamically optimizing lookup speed in a packet processing table. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

A packet processing device such as a switch may include one or more packet processing tables that each include one or more rules for specifying how the switch should process incoming packets. Each rule may include one or more match fields and one or more actions. The one or more match fields of a rule specify a packet matching criteria for a packet to match the rule. For example, the match fields may match packets based on destination IP address or incoming port, and can match on the complete field or parts of the field (e.g., on prefixes or arbitrary bits). A packet that matches all of the one or more match fields of a rule is said to match that rule. The one or more action fields of a rule specify the actions that the switch should apply to packets that match the rule.

A switch may use a lookup algorithm to match packets against rules in a packet processing table to find a matching rule. Currently, the OpenFlow standard does not specify the lookup algorithm that a switch should use to match packets against rules in a packet processing table. Most switches match packets using a hash-based lookup algorithm or a linear search lookup algorithm.

Sophisticated switches (e.g., software switches) typically implement multiple diverse functionalities such as Media Access Control (MAC) learning, routing, and firewall functionality, with each of these functionalities implementing different packet processing tables containing different types of rules and different number of rules. Different types of lookup algorithms may work better for different packet processing tables depending on the population of those packet processing tables.

For example, a tree-based lookup algorithm (e.g., longest-prefix match) is well-suited for a packet processing table that matches packets based on Internet Protocol (IP) address. However, in the case of a data center gateway that matches packets based on a virtual IP address, the rules in the packet processing table would match on the full IP address (e.g., prefix is /32). In this case, a hash-based lookup algorithm may perform better than a tree-based lookup algorithm.

As another example, in a hybrid Software Defined Networking (SDN) scenario, the rules in a packet processing table may arrive from a routing protocol such as Open Shortest Path First (OSPF). In this case, neither the number of rules nor the syntax of the rules can be predicted at switch configuration time. For example, a corporate Local Area Network (LAN) may only have /24 subnets, in which case packets can be matched based on IP address using a hash-based lookup algorithm. It is also possible that there are some alternate/fallback routes which are only activated if there is a problem in the network and these routes may not be /24 routes. In this case, the hash-based lookup algorithm may not work with the alternate/fallback routes due to the alternate/fallback routes not being compatible with the hash function (e.g., the alternate/fallback routes may use a different mask than the /24 routes).

In some cases, a switch maintains a large number of relatively small packet processing tables. In this case, more complex lookup algorithms such as hash-based lookup algorithms or tree-based lookup algorithms may not be efficient. Rather, a simpler lookup algorithm such as a linear search lookup algorithm may be more appropriate in this case.

For example, the first packet processing table in a switch typically matches packets based on the port that a packet arrived from. In a Network Function Virtualization (NFV) environment, virtual ports are used to connect virtual network functions (VNFs). These ports are dynamically created and destroyed based on orchestrator decisions. Supporting these ports or port groups typically requires only a few number of rules. As such, in this case, a simpler lookup algorithm may be more appropriate.

As another example, in an NFV environment, services are typically identified based on virtual IP addresses. Typically, a given server blade runs only a few service instances that require the handling of a few, but dynamically changing IP addresses in the forwarding and load distribution tables. As with the above example, a simpler lookup algorithm may be more appropriate.

Switches typically do not have a-priori information regarding the population of packet processing tables, and thus often resort to using a single generic lookup algorithm for all packet processing tables, which may result in sub-optimal performance.

In some cases, a switch may obtain some information regarding the expected population of a particular packet processing table before the switch enters into operation (e.g., via Table Typing Patterns). In this case, the switch can be configured to use particular lookup algorithm that is suitable for that particular packet processing table. For example, the switch may be configured to use a simple linear search lookup algorithm for smaller packet processing tables and to use a hash-based lookup algorithm for larger packet processing tables. However, this decision can only be made at switch configuration time, before the switch enters into operation. Once the switch is operational, the lookup algorithms for the respective packet processing tables are fixed.

If it can be assumed that a given use case can be properly dimensioned (e.g., the expected size of packet processing tables can be known), then it is sufficient to select a lookup algorithm to use to match packets against rules in a packet processing table at switch configuration time. However, there are use cases where the number of rules in a packet processing table and/or the type of rules in a packet processing table cannot be accurately predicted at switch configuration time, as the population of the packet processing table can change during the lifetime of the switch. It is often the case that a switch will not be aware of what the population of a particular packet processing table will look like until the switch is in operation (during runtime).

Embodiments described herein dynamically optimize lookup speed by allowing a switch to dynamically select the lookup algorithm to use to match packets against a particular packet processing table based on one or more runtime metrics of that packet processing table. During runtime, a switch may decide to change the lookup algorithm being used to match packets against a particular packet processing table if the switch deems that a different lookup algorithm will yield better performance than the current lookup algorithm. This decision can be made based on one or more runtime metrics of the packet processing table such as the number of rules in the packet processing table and the syntax of rules in the packet processing table. This provides an improvement over existing techniques where the lookup algorithm is set at switch configuration time and is fixed once the switch enters into operation. Embodiments are further described herein below with reference to the exemplary diagrams.

FIG. 1 is a block diagram of a network device that is configured to dynamically optimize lookup speed, according to some embodiments. The network device 100 may be a data plane device that is responsible for processing packets in a network (e.g., a packet processing device). The network device 100 may be communicatively coupled to a network controller 105 that is responsible for managing the network device 100. In one embodiment, the network device 100 is an OpenFlow switch and the network controller is an OpenFlow controller. As shown, the network device 100 includes a processor 110 and a memory 120. It should be understood, however, that the network device 100 can include other components. The processor 110 includes a lookup optimization module 150, an instruction cache 130, and a data cache 140. The memory includes a code fragment store 170 and one or more packet processing tables 160 (which is commonly referred to as a flow table in OpenFlow parlance).

Each of the packet processing tables 160 (e.g., packet processing table 160A) may include one or more rules for specifying how the switch should process incoming packets (which is commonly referred to as a flow entry in OpenFlow parlance). The one or more packet processing tables 160 are sometimes referred to collectively as a packet processing pipeline. The network controller 105 may program the rules in the packet processing tables 160 maintained at the network device 100 using OpenFlow or a similar protocol. In one embodiment, the rules in the packet processing tables 160 may be programmed via a command line interface (CLI) or a routing protocol (e.g., Border Gateway Protocol (BGP)). Each rule includes one or more match fields and one or more actions. For example, rule #K in packet processing table 160A includes N number of match fields (match fields #1-N) and Y number of actions (actions #1-Y). The one or more match fields of a rule specify a packet matching criteria for a packet to match the rule. For example, the match fields may match packets based on destination IP address or incoming port, and can match on the complete field or parts of the field (e.g., on prefixes or arbitrary bits). A packet that matches all of the one or more match fields of a rule is said to match that rule. The one or more action fields of a rules specify the actions that the switch should apply to packets that match the rule. The actions may include, but are not limited to, directing the packet to another packet processing table 160, modifying the packet, and forwarding the packet to a particular port.

Typically, when the network device 100 receives an incoming packet in the data plane, the network device 100 matches the packet against rules in the first packet processing table 160 of the packet processing pipeline. If the packet matches a particular rule in the packet processing table 160, then the network device 100 applies the actions of that particular rule on the packet. The packet may also be matched against the rules in subsequent packet processing tables 160 in a similar fashion.

The network device 100 may use a lookup algorithm to match a packet against the rules in a packet processing table 160 in order to find a matching rule. The network device 100 may support multiple lookup algorithms. For example, the network device 100 may support an inline lookup algorithm, a linear search lookup algorithm, a hash-based lookup algorithm, a tree-based lookup algorithm, or any suitable lookup algorithm.

According to some embodiments, the network device 100 may execute the lookup optimization module 150 to dynamically select the lookup algorithm to use to match packets against a particular packet processing table 160. The lookup algorithm that a network device 100 uses to match packets against the rules in a particular packet processing table 160 may be referred to herein as the lookup algorithm for that particular packet processing table 160. The selection of the lookup algorithm is dynamic in the sense that the network device 100 can select the lookup algorithm for a packet processing table 160 while the network device 100 is in operation (during runtime) based on one or more runtime metrics of that packet processing table 160. In one embodiment, the one or more runtime metrics of the packet processing table 160 includes the number of rules in the packet processing table 160 and/or the syntax of rules in the packet processing table 160. This allows the network device 100 to automatically change the lookup algorithm being used as the population of the packet processing table 160 changes. In this way, the network device 100 can select a lookup algorithm that is appropriate and efficient for the current population of the packet processing table 160, and is not confined to using the same lookup algorithm that was initially set when the network device 100 was first configured, as is done conventionally.

Some lookup algorithms may be more efficient than other lookup algorithms when matching packets against rules in a given packet processing table 160 depending on the population of that packet processing table 160. That is, different lookup algorithms may be more efficient for different packet processing tables 160. As such, in one embodiment, the network device 100 may independently select a lookup algorithm for each packet processing table 160 maintained at the network device 100 based on the respective runtime metrics of the packet processing tables 160 maintained at the network device 100.

An exemplary lookup algorithm selection process is described below. It should be understood that this lookup algorithm selection process is provided by way of example, and is not intended to be limiting. The lookup algorithm selection process described below selects a lookup algorithm from a set of five different lookup algorithms (inline lookup algorithm, linear search lookup algorithm, perfect hash lookup algorithm, generic hash lookup algorithm, and a tree-based lookup algorithm). Different embodiments may employ different criteria for selecting lookup algorithms and may select from a different set of lookup algorithms.

1. If the number of rules in a packet processing table 160 is less than a first threshold value, then the network device 100 selects an inline lookup algorithm. When the number of rules in the packet processing table 160 is small, the inline lookup algorithm helps improve lookup speed. The inline lookup algorithm is described in additional detail below.
2. If the number of rules in the packet processing table 160 is larger than or equal to the first threshold value but less than a second threshold value, then the network device 100 selects a linear search lookup algorithm.
3. If the rules in the packet processing table 160 have the same type of key and the same mask, then the network device 100 selects a hash-based lookup algorithm (e.g., perfect hash lookup algorithm or generic hash lookup algorithm).
    a. If a perfect hash function can be generated for the rules in the table, then the network device 100 selects a perfect hash lookup algorithm.
    b. If a perfect hash function cannot be generated for the rules in the table, then the network device 100 selects a generic hash lookup algorithm.
4. If the rules in the packet processing table 160 have the same type of key but a different mask, but the mask is always in the form of 1*0* (one bits followed by zero bits) and rule priority is based on the number of leading one bits in the mask, then the network device 100 selects a tree-based lookup algorithm.
5. If none of the above criteria is met, then the network device 100 defaults to a linear search lookup algorithm.

It should be noted that there can be other lookup algorithms that are more efficient than the lookup algorithms mentioned above in cases where a given syntax or pattern is valid for the rules in the packet processing table 160 and the number of rules is below a limit. It should be understood that the lookup algorithm selection process described above can be modified or extended to accommodate such lookup algorithms. In one embodiment, the lookup algorithm selection process may also take into consideration the effort to change from one lookup algorithm to another.

If a particular packet processing table 160 includes different types of rules (e.g., with non-uniform syntax), it is possible that the network device 100 will often times resort to selecting a more generic but less efficient lookup algorithm such as a linear search lookup algorithm. In this case, lookup speed can be further optimized by segmenting the particular packet processing table 160 into sub-tables such that each sub-table includes similar rules (e.g., in terms of syntax). Once the packet processing table 160 is segmented into sub-tables, the network device 100 may select a lookup algorithm for each sub-table that optimizes lookup speed in that sub-table (e.g., using a similar selection process as described above).

Once the network device 100 selects the lookup algorithm for the packet processing table 160, the network device 100 may configure itself to match packets against rules in the packet processing table 160 using the selected lookup algorithm for the packet processing table 160. In one embodiment, this may involve obtaining code for the selected lookup algorithm (e.g., from memory 120) and loading it into the instruction cache 130, as well as building a new data structure for the packet processing table 160 that is suitable for use with the selected lookup algorithm (e.g., a hash table, linked list, trie, etc.) in the data cache 140. When the network device 100 receives an incoming packet to be forwarded, the processor 110 may execute the code stored in the instruction cache 130 to run the selected lookup algorithm to match the packet against rules in the packet processing table 160, which may also involve accessing the data structure stored in the data cache 140, as needed.

In one embodiment, the network device 100 initiates the lookup algorithm selection process to select a lookup algorithm for a packet processing table 160 when the network device 100 receives an instruction to add a new rule to the packet processing table 160 (e.g., from the network controller 105). The lookup algorithm selection process may result in a determination that the current lookup algorithm for the packet processing table 160 is still optimal and that the network device 100 should continue to use the current lookup algorithm to match packets against the packet processing table 160. In this case, the network device 100 may simply add the new rule to the packet processing table 160 and the network device 100 may continue to match packets against the packet processing table 160 using the current lookup algorithm for that packet processing table 160. In some cases, the lookup algorithm selection process may result in a determination that a different lookup algorithm is more optimal (e.g., in terms of lookup speed) than the current lookup algorithm for the packet processing table 160 and that the network device 100 should switch to using a new lookup algorithm. In this case, the network device 100 may build a new data structure for the packet processing table 160 that is suitable for use with the new lookup algorithm. It should be noted that while the new data structure is being built, the packet processing can still continue. That is, packets can still be processed using the old rule set without the new rule (using the old lookup algorithm and the old data structure). When the new data structure is ready (with the new rule), the network device 100 can switch to using the new lookup algorithm.

In one embodiment, the network device 100 initiates the lookup algorithm selection process to select a lookup algorithm for a packet processing table 160 when the network device 100 receives an instruction to remove a rule from the packet processing table 160 (e.g., from the network controller 105). The lookup algorithm selection process may result in a determination that the current lookup algorithm for the packet processing table 160 is still optimal and that the network device 100 should continue to use the current lookup algorithm to match packets against the packet processing table 160. In this case, the network device 100 may simply remove the rule from the packet processing table 160 and the network device 100 may continue to match packets against the packet processing table 160 using the current lookup algorithm for that packet processing table 160. In some cases, the lookup algorithm selection process may result in a determination that a different lookup algorithm is more optimal (e.g., in terms of lookup speed) than the current lookup algorithm for the packet processing table 160 and that the network device 100 should switch to using a new lookup algorithm. In this case, the network device 100 may build a new data structure for the packet processing table 160 that is suitable for use with the new lookup algorithm. It should be noted that while the new data structure is being built, the packet processing can still continue. That is, packets can still be processed using the new rule set with the rule removed (using the old lookup algorithm and the old data structure). When the new data structure is ready, the network device 100 can switch to using the new lookup algorithm. In one embodiment, the lookup algorithm selection process is only initiated after a threshold number of rule removals so that not every rule removal initiates the selection process. In another embodiment, the lookup algorithm selection process is initiated periodically (e.g., based on a timer).

The time required to deploy a new lookup algorithm depends on the particulars of the lookup algorithm and the number of rules, but for most practical scenarios, it has been shown that the time is in the order of milliseconds. It should be noted that rule priority is not a problem here. Exact match algorithms can use the fact that two completely identical rules cannot be present in the switch. Some lookup algorithms (e.g., longest prefix match) build in the knowledge of priority, while wildcard-based algorithms typically use priority to decide at multiple matches (such as Direct Composition of Field Labels (DCFL)) or algorithmically ensure that the first match always has the highest priority (e.g., linear search algorithm).

As mentioned above, an inline lookup algorithm can help improve lookup speed, especially when the number of rules in the packet processing table 160 is relatively small and the rules are dynamically added/deleted. Inline lookup algorithms utilize dynamic code generation to achieve fast lookup speeds. With inline lookup algorithms, instead of iterating through match fields stored in memory and applying them one by one for each rule, lookup code is dynamically generated on the fly when a rule is added to the packet processing table 160. Each match field of each rule is implemented as code and linked together to form one piece of lookup code that handles all match fields of all rules without further memory access. The network device 100 may select pre-generated code fragments corresponding to the match field type from the precompiled code fragment store 170 and copy the relevant code fragments to a contiguous memory block (e.g., in the instruction cache 130), while also replacing the symbols in the code fragments that correspond to the key values with actual key values. Since the values are embedded in the lookup code, the lookup requires minimal data access. In this way, the lookup can be performed entirely in code, and does not require data access. The inline lookup algorithm with dynamically generated lookup code helps minimize the number of required branches. Instead of having to perform generic "switch on match type, switch on lookup result" operations, the lookup code is generated such that jumps to other instructions are only needed when the corresponding match field fails and processing needs to jump to the next rule (not the next match field in the current rule). Also, the inline lookup algorithm with dynamically generated lookup code reduces or eliminates the need for data access, thereby improving lookup speed. For example, an inline lookup algorithm may only require accessing the dynamically generated lookup code in the instruction cache 130 (and not the data cache 140 or memory 120) since the lookup data is embedded in the lookup code as constants.

The size of the dynamically generated lookup code may be limited by the size of the instruction cache 130, and thus cannot be arbitrarily large. Thus, an inline lookup algorithm is more appropriate for cases where the number of rules in the packet processing table 160 is relatively small.

While the new lookup code is being generated, packet processing can continue with the old rule set. After the new lookup code (which includes the new rule) is generated, the network device 100 may replace the old lookup code in the instruction cache 130 with the new lookup code. It has been shown that dynamic lookup code can be generated at a rate of about 10,000 rule changes per second, which is not significantly slower than a normal rule update in which dynamic code generation is not required (e.g., inserting an entry into a longest prefix match trie).

Figure 2:
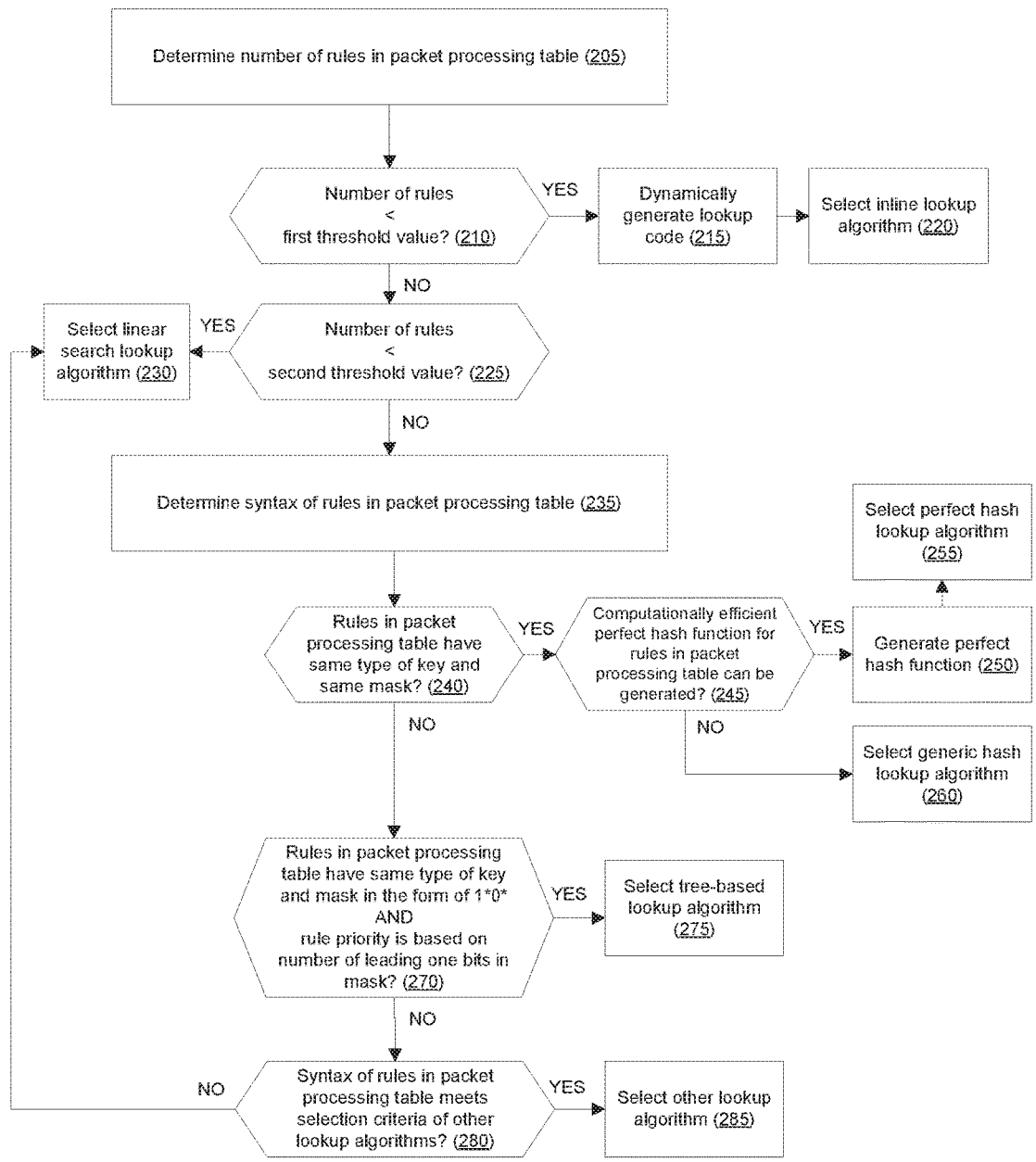
FIG. 2 is a flow diagram of a lookup algorithm selection process, according to some embodiments.

FIG. 2 is a flow diagram of a lookup algorithm selection process, according to some embodiments. The process dynamically selects a lookup algorithm to use to match packets against a packet processing table 160 based on the number of rules in the packet processing table 160 and the syntax of rules in the packet processing table 160. In one embodiment, the operations of the flow diagram may be performed by a network device that maintains (e.g., stores) the packet processing table 160 (e.g., network device 100). The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

The network device 100 first determines the number of rules in the packet processing table 160 (block 205). The network device 100 then determines whether the number of rules in the packet processing table 160 is less than a first threshold value (decision block 210). If so, then the network device 100 dynamically generates lookup code for the packet processing table 160 (block 215) and selects an inline lookup algorithm that utilizes the dynamically generated lookup code as the lookup algorithm for the packet processing table 160 (block 220). In one embodiment, the dynamically generated lookup code has information regarding a match field and/or an action of a rule in the packet processing table 160 embedded therein. This allows the inline lookup algorithm to minimize data access, which can help improve lookup speed. In one embodiment, the network device 100 selects an inline lookup algorithm based on the number of match fields in the rules in the packet processing table 160 (instead of based on the number of rules) since the length of the dynamically generated lookup code is based on the number of match fields used. However, the number of rules also serves as a good proxy for this purpose.

Returning to decision block 210, if the network device 100 determines that the number of rules in the packet processing table 160 is larger than or equal to the first threshold value, then the network device 100 determines whether the number of rules in the packet processing table 160 is less than a second threshold value (which is larger than the first threshold value) (decision block 225). If so, then the network device 100 selects a linear search lookup algorithm as the lookup algorithm for the packet processing table 160 (block 230). A linear search lookup algorithm may be more efficient than a hash-based lookup algorithm if the number of rules in the packet processing table 160 is small enough such that the cost for performing the linear search (which largely depends on the number of rules) is smaller than the cost of the hash function (which can be regarded as a fixed cost that is independent of the number of rules). As such, the second threshold value can be set based on the complexity of the hash function. In general, the second threshold value should be larger for more complex hash functions. In one embodiment, the second threshold value can be determined based on code analysis or empirical measurements. In one embodiment, if there is a significant difference between processor architectures in calculating the hash function (e.g., using hardware acceleration), then the second threshold value may be architecture-specific.

Returning to decision block 225, if the number of rules in the packet processing table 160 is larger than or equal to the second threshold value, then the network device 100 determines the syntax of the rules in the packet processing table 160. The syntax of the rules may include the type of key and the mask used by the rules. The network device 100 determines whether the rules in the packet processing table 160 use the same type of key and the same mask (e.g., all /24 routes) (decision block 240). If so, then the network device 100 determines whether a computationally efficient perfect hash function for the rules in the packet processing table 160 can be generated (decision block 245). A perfect hash function is a hash function that has no collisions. A perfect hash function is computationally efficient if meets or exceeds a predetermined level of computational efficiency (e.g., as defined by a network operator or other entity). If the network device 100 determines that a computationally efficient perfect hash function for the rules in the packet processing table 160 can be generated, then the network device 100 generates the perfect hash function and selects a perfect hash lookup algorithm as the lookup algorithm for the packet processing table 160 (the perfect hash lookup algorithm can use the perfect hash function) (block 255). Returning to decision block 245, if the network device 100 determines that a computationally efficient perfect hash function for the rules in the packet processing table 160 cannot be generated, then the network device 100 selects a generic hash lookup algorithm (which uses a hash function that may have collisions) as the lookup algorithm for the packet processing table 160.

Returning to decision block 240, if the network device 100 determines that the rules in the packet processing table 160 do not use the same type of key or do not use the same mask, then the network device 100 determines whether the rules in the packet processing table 160 use the same type of key and a mask in the form of 1*0* (e.g., one or more leading one bits followed by zero bits) and that rule priority in the packet processing table 160 is based on the number of leading one bits in the mask (e.g., a longest prefix match scenario). If so, then the network device 100 selects a tree-based lookup algorithm as the lookup algorithm for the packet processing table 160.

Returning to decision block 270, if the network device 100 determines that the rules in the packet processing table 160 do not use the same type of key and a mask in the form of 1*0* or that rule priority in the packet processing table 160 is not based on the number of leading one bits in the mask, then the network device 100 determines whether the syntax of rules in the packet processing table 160 meets the selection criteria of other lookup algorithms supported by the network device 100 (decision block 280). If so, then the network device 100 selects one of the other lookup algorithms as the lookup algorithm for the packet processing table 160. This way, the process can be extended to support additional types of lookup algorithms, as needed (e.g., optimized firewall lookup or DCFL). In general, if there are multiple possible lookup algorithms that can be used to match packets against rules in a given packet processing table 160, then these possible lookup algorithms should be checked in specific-to-generic order since the more specific lookup algorithms are likely to be faster than the more generic lookup algorithms. Returning to decision block 280, if the network device 100 determines that the syntax of the rules in the packet processing table 160 do not meet the selection criteria of any of the other lookup algorithms, then the network device 100 selects a linear search lookup algorithm as the lookup algorithm for the packet processing table 160. In this example, the linear search lookup algorithm serves as the default lookup algorithm if the selection criteria of the other lookup algorithms is not met.

Figure 3:
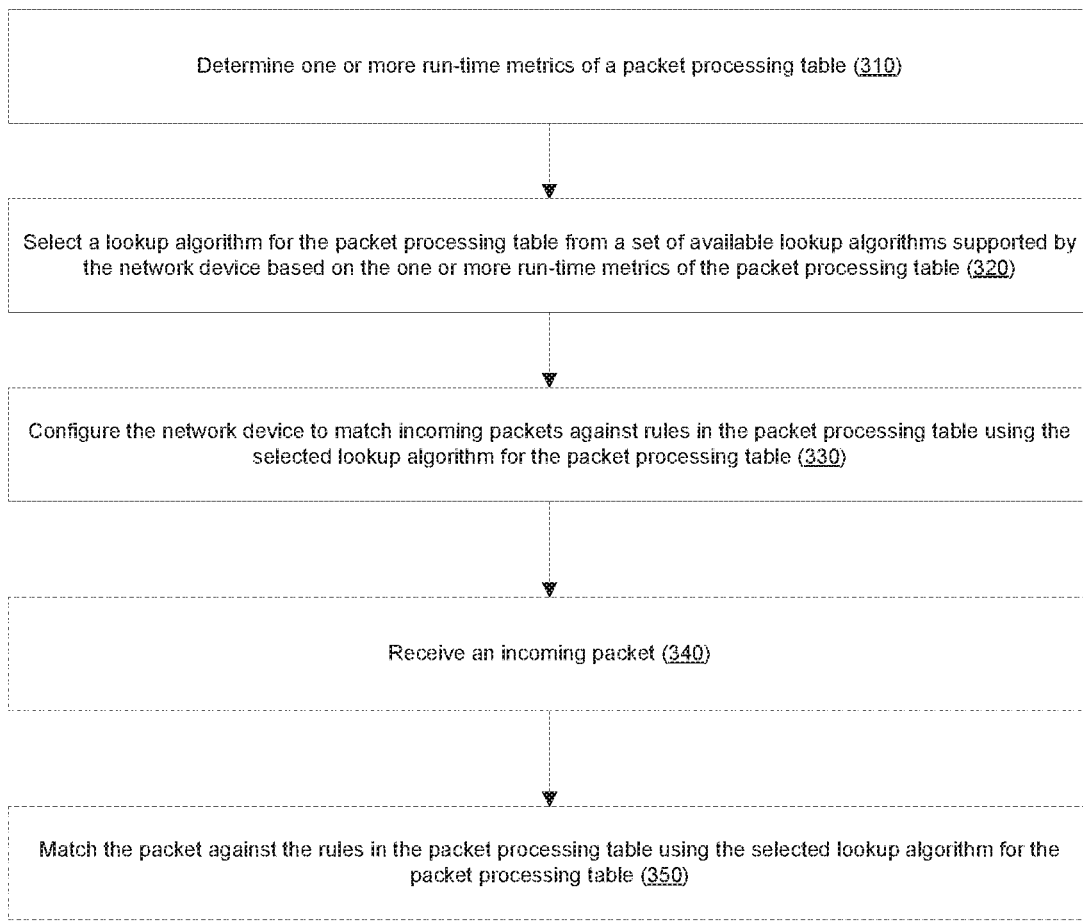
FIG. 3 is a flow diagram of a process to dynamically optimize lookup speed in a packet processing table, according to some embodiments.

FIG. 3 is a flow diagram of a process to dynamically optimize lookup speed in a packet processing table, according to some embodiments. In one embodiment, the operations of the flow diagram may be performed by a network device 100 that maintains (e.g., stores) the packet processing table 160 (e.g., network device 100).

In one embodiment, the process is initiated when the network device 100 determines that a rule is to be added to the packet processing table 160. In another embodiment, the process is initiated when the network device 100 determines that a rule is to be removed from the packet processing table 160. In yet another embodiment, the process is initiated periodically (e.g., based on a timer).

The network device 100 determines one or more runtime metrics of the packet processing table 160 (block 310). In one embodiment, the one or more runtime metrics of the packet processing table 160 include the number of rules in the packet processing table 160 and/or the syntax of rules in the packet processing table 160.

The network device 100 then selects a lookup algorithm for the packet processing table 160 from a set of available lookup algorithms supported by the network device 100 based on the one or more runtime metrics of the packet processing table 160 (block 320). In one embodiment, the network device 100 can perform a lookup algorithm selection process such as that described above with reference to FIG. 2 or a similar process to select a lookup algorithm for the packet processing table 160. In one embodiment, the set of lookup algorithms supported by the network device 100 may include an inline lookup algorithm, a linear search lookup algorithm, a perfect hash lookup algorithm, a generic hash lookup algorithm, a tree-based lookup algorithm, or any combination thereof.

The network device 100 configures itself to match incoming packets against rules in the packet processing table 160 using the selected lookup algorithm for the packet processing table 160 (block 330). This configuration may involve importing code for the selected lookup algorithm from memory 120 into the instruction cache 130 and building a data structure for the packet processing table 160 in the data cache 140 that is suitable for use with the selected lookup algorithm.

According to some embodiments, when the network device 100 subsequently receives a packet (block 340), the network device 100 matches the packet against the rules in the packet processing table 160 using the selected lookup algorithm for the packet processing table 160 (block 350). The network device 100 can repeat this process or a similar process to select a lookup algorithm for other packet processing tables 160 maintained at the network device 100. In this way, the network device 100 is able to select a lookup algorithm that optimizes lookup speed in a packet processing table 160.

FIG. 4A illustrates connectivity between network devices (NDs) within an exemplary network, as well as three exemplary implementations of the NDs, according to some embodiments of the invention. FIG. 4A shows NDs 400A-H, and their connectivity by way of lines between 400A-400B, 400B-400C, 400C-400D, 400D-400E, 400E-400F, 400F-400G, and 400A-400G, as well as between 400H and each of 400A, 400C, 400D, and 400G. These NDs are physical devices, and the connectivity between these NDs can be wireless or wired (often referred to as a link). An additional line extending from NDs 400A, 400E, and 400F illustrates that these NDs act as ingress and egress points for the network (and thus, these NDs are sometimes referred to as edge NDs; while the other NDs may be called core NDs).

Two of the exemplary ND implementations in FIG. 4A are: 1) a special-purpose network device 402 that uses custom application-specific integrated-circuits (ASICs) and a special-purpose operating system (OS); and 2) a general purpose network device 404 that uses common off-the-shelf (COTS) processors and a standard OS.

The special-purpose network device 402 includes networking hardware 410 comprising compute resource(s) 412 (which typically include a set of one or more processors), forwarding resource(s) 414 (which typically include one or more ASICs and/or network processors), and physical network interfaces (NIs) 416 (sometimes called physical ports), as well as non-transitory machine readable storage media 418 having stored therein networking software 420. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 400A-H. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A).

Software 420 can include code such as lookup optimization module 423, which when executed by networking hardware 410, causes the special-purpose network device 402 to perform operations of one or more embodiments of the present invention as part of networking software instances 422.

The special-purpose network device 402 is often physically and/or logically considered to include: 1) a ND control plane 424 (sometimes referred to as a control plane) comprising the compute resource(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the compute resource(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

FIG. 4B illustrates an exemplary way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 404 includes hardware 440 comprising a set of one or more processor(s) 442 (which are often COTS processors) and network interface controller(s) 444 (NICs; also known as network interface cards) (which include physical NIs 446), as well as non-transitory machine readable storage media 448 having stored therein software 450. During operation, the processor(s) 442 execute the software 450 to instantiate one or more sets of one or more applications 464A-R. While one embodiment does not implement virtualization, alternative embodiments may use different forms of virtualization. For example, in one such alternative embodiment the virtualization layer 454 represents the kernel of an operating system (or a shim executing on a base operating system) that allows for the creation of multiple instances 462A-R called software containers that may each be used to execute one (or more) of the sets of applications 464A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 454 represents a hypervisor (sometimes referred to as a virtual machine monitor (VMM)) or a hypervisor executing on top of a host operating system, and each of the sets of applications 464A-R is run on top of a guest operating system within an instance 462A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 440, directly on a hypervisor (in which case the unikernel is sometimes described as running within a LibOS virtual machine), or in a software container, embodiments can be implemented fully with unikernels running directly on a hypervisor represented by virtualization layer 454, unikernels running within software containers represented by instances 462A-R, or as a combination of unikernels and the above-described techniques (e.g., unikernels and virtual machines both run directly on a hypervisor, unikernels and sets of applications that are run in different software containers).

The instantiation of the one or more sets of one or more applications 464A-R, as well as virtualization if implemented, are collectively referred to as software instance(s) 452. Each set of applications 464A-R, corresponding virtualization construct (e.g., instance 462A-R) if implemented, and that part of the hardware 440 that executes them (be it hardware dedicated to that execution and/or time slices of hardware temporally shared), forms a separate virtual network element(s) 460A-R.

The virtual network element(s) 460A-R perform similar functionality to the virtual network element(s) 430A-R—e.g., similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 462A-R to VNEs also apply to embodiments where such a finer level of granularity and/or unikernels are used.

In certain embodiments, the virtualization layer 454 includes a virtual switch that provides similar forwarding services as a physical Ethernet switch. Specifically, this virtual switch forwards traffic between instances 462A-R and the NIC(s) 444, as well as optionally between the instances 462A-R; in addition, this virtual switch may enforce network isolation between the VNEs 460A-R that by policy are not permitted to communicate with each other (e.g., by honoring virtual local area networks (VLANs)).

Software 450 can include code such as lookup optimization module 453, which when executed by processor(s) 442, cause the general purpose network device 404 to perform operations of one or more embodiments of the present invention as part software instances 462A-R.

The third exemplary ND implementation in FIG. 4A is a hybrid network device 406, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 4C:
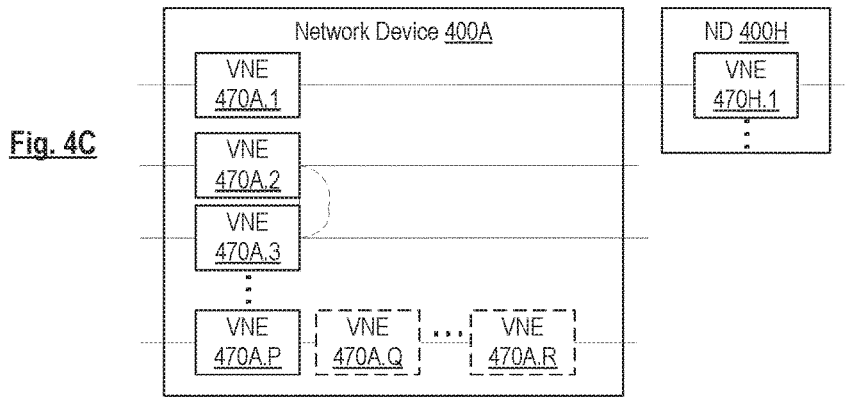
FIG. 4C illustrates various exemplary ways in which virtual network elements (VNEs) may be coupled, according to some embodiments.

FIG. 4C illustrates various exemplary ways in which VNEs may be coupled according to some embodiments of the invention. FIG. 4C shows VNEs 470A.1-470A.P (and optionally VNEs 470A.Q-470A.R) implemented in ND 400A and VNE 470H.1 in ND 400H. In FIG. 4C, VNEs 470A.1-P are separate from each other in the sense that they can receive packets from outside ND 400A and forward packets outside of ND 400A; VNE 470A.1 is coupled with VNE 470H.1, and thus they communicate packets between their respective NDs; VNE 470A.2-470A.3 may optionally forward packets between themselves without forwarding them outside of the ND 400A; and VNE 470A.P may optionally be the first in a chain of VNEs that includes VNE 470A.Q followed by VNE 470A.R (this is sometimes referred to as dynamic service chaining, where each of the VNEs in the series of VNEs provides a different service—e.g., one or more layer 4-7 network services). While FIG. 4C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 4A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 4A may also host one or more such servers (e.g., in the case of the general purpose network device 404, one or more of the software instances 462A-R may operate as servers; the same would be true for the hybrid network device 406; in the case of the special-purpose network device 402, one or more such servers could also be run on a virtualization layer executed by the compute resource(s) 412); in which case the servers are said to be co-located with the VNEs of that ND.

A virtual network is a logical abstraction of a physical network (such as that in FIG. 4A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 4D:
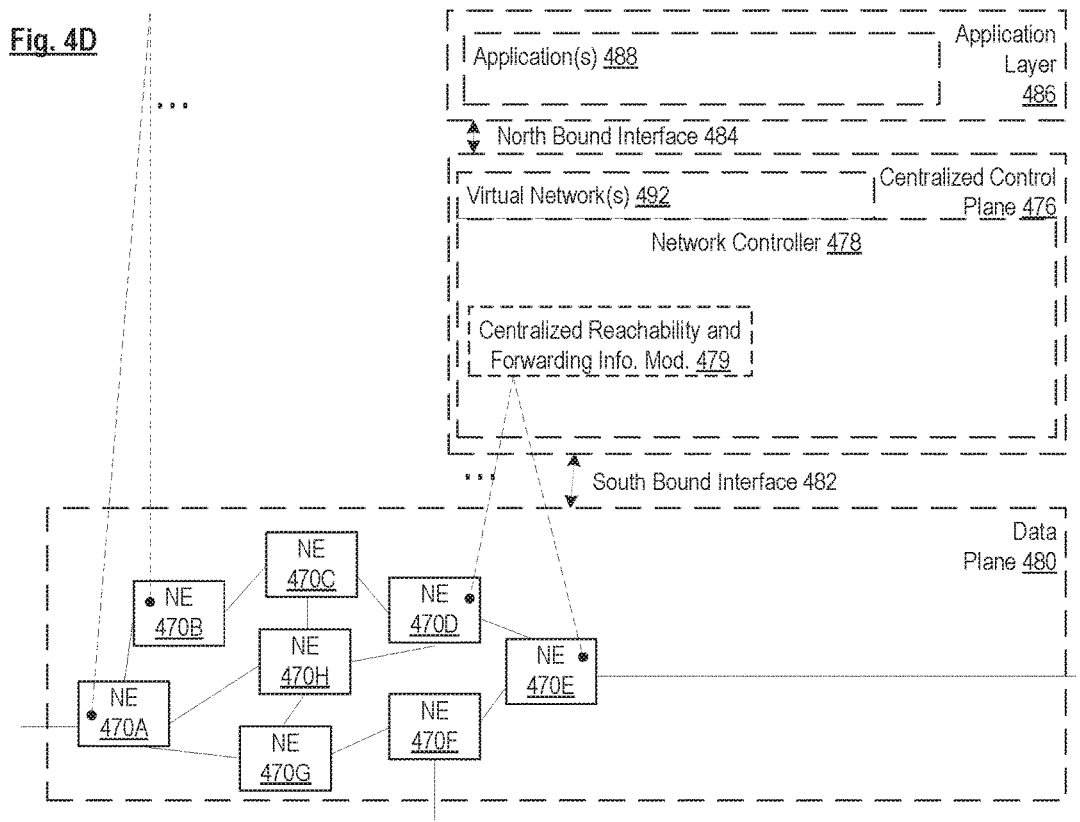
FIG. 4D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 4D illustrates a network with a single network element on each of the NDs of FIG. 4A, and within this straight forward approach contrasts a traditional distributed approach (commonly used by traditional routers) with a centralized approach for maintaining reachability and forwarding information (also called network control), according to some embodiments of the invention. Specifically, FIG. 4D illustrates network elements (NEs) 470A-H with the same connectivity as the NDs 400A-H of FIG. 4A.

FIG. 4D illustrates that the distributed approach 472 distributes responsibility for generating the reachability and forwarding information across the NEs 470A-H; in other words, the process of neighbor discovery and topology discovery is distributed.

For example, where the special-purpose network device 402 is used, the control communication and configuration module(s) 432A-R of the ND control plane 424 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 470A-H (e.g., the compute resource(s) 412 executing the control communication and configuration module(s) 432A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 424. The ND control plane 424 programs the ND forwarding plane 426 with information (e.g., adjacency and route information) based on the routing structure(s). For example, the ND control plane 424 programs the adjacency and route information into one or more forwarding table(s) 434A-R (e.g., Forwarding Information Base (FIB), Label Forwarding Information Base (LFIB), and one or more adjacency structures) on the ND forwarding plane 426. For layer 2 forwarding, the ND can store one or more bridging tables that are used to forward data based on the layer 2 information in that data. While the above example uses the special-purpose network device 402, the same distributed approach 472 can be implemented on the general purpose network device 404 and the hybrid network device 406.

FIG. 4D illustrates that a centralized approach 474 (also known as software defined networking (SDN)) that decouples the system that makes decisions about where traffic is sent from the underlying systems that forwards traffic to the selected destination. The illustrated centralized approach 474 has the responsibility for the generation of reachability and forwarding information in a centralized control plane 476 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 476 has a south bound interface 482 with a data plane 480 (sometime referred to the infrastructure layer, network forwarding plane, or forwarding plane (which should not be confused with a ND forwarding plane)) that includes the NEs 470A-H (sometimes referred to as switches, forwarding elements, data plane elements, or nodes). The centralized control plane 476 includes a network controller 478, which includes a centralized reachability and forwarding information module 479 that determines the reachability within the network and distributes the forwarding information to the NEs 470A-H of the data plane 480 over the south bound interface 482 (which may use the OpenFlow protocol). Thus, the network intelligence is centralized in the centralized control plane 476 executing on electronic devices that are typically separate from the NDs.

For example, where the special-purpose network device 402 is used in the data plane 480, each of the control communication and configuration module(s) 432A-R of the ND control plane 424 typically include a control agent that provides the VNE side of the south bound interface 482. In this case, the ND control plane 424 (the compute resource(s) 412 executing the control communication and configuration module(s) 432A-R) performs its responsibility for participating in controlling how data (e.g., packets) is to be routed (e.g., the next hop for the data and the outgoing physical NI for that data) through the control agent communicating with the centralized control plane 476 to receive the forwarding information (and in some cases, the reachability information) from the centralized reachability and forwarding information module 479 (it should be understood that in some embodiments of the invention, the control communication and configuration module(s) 432A-R, in addition to communicating with the centralized control plane 476, may also play some role in determining reachability and/or calculating forwarding information—albeit less so than in the case of a distributed approach; such embodiments are generally considered to fall under the centralized approach 474, but may also be considered a hybrid approach).

While the above example uses the special-purpose network device 402, the same centralized approach 474 can be implemented with the general purpose network device 404 (e.g., each of the VNE 460A-R performs its responsibility for controlling how data (e.g., packets) is to be routed (e.g., the next hop for the data and the outgoing physical NI for that data) by communicating with the centralized control plane 476 to receive the forwarding information (and in some cases, the reachability information) from the centralized reachability and forwarding information module 479; it should be understood that in some embodiments of the invention, the VNEs 460A-R, in addition to communicating with the centralized control plane 476, may also play some role in determining reachability and/or calculating forwarding information—albeit less so than in the case of a distributed approach) and the hybrid network device 406. In fact, the use of SDN techniques can enhance the NFV techniques typically used in the general purpose network device 404 or hybrid network device 406 implementations as NFV is able to support SDN by providing an infrastructure upon which the SDN software can be run, and NFV and SDN both aim to make use of commodity server hardware and physical switches.

FIG. 4D also shows that the centralized control plane 476 has a north bound interface 484 to an application layer 486, in which resides application(s) 488. The centralized control plane 476 has the ability to form virtual networks 492 (sometimes referred to as a logical forwarding plane, network services, or overlay networks (with the NEs 470A-H of the data plane 480 being the underlay network)) for the application(s) 488. Thus, the centralized control plane 476 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 4D shows the distributed approach 472 separate from the centralized approach 474, the effort of network control may be distributed differently or the two combined in certain embodiments of the invention. For example: 1) embodiments may generally use the centralized approach (SDN) 474, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 474, but may also be considered a hybrid approach.

While FIG. 4D illustrates the simple case where each of the NDs 400A-H implements a single NE 470A-H, it should be understood that the network control approaches described with reference to FIG. 4D also work for networks where one or more of the NDs 400A-H implement multiple VNEs (e.g., VNEs 430A-R, VNEs 460A-R, those in the hybrid network device 406). Alternatively or in addition, the network controller 478 may also emulate the implementation of multiple VNEs in a single ND. Specifically, instead of (or in addition to) implementing multiple VNEs in a single ND, the network controller 478 may present the implementation of a VNE/NE in a single ND as multiple VNEs in the virtual networks 492 (all in the same one of the virtual network(s) 492, each in different ones of the virtual network(s) 492, or some combination). For example, the network controller 478 may cause an ND to implement a single VNE (a NE) in the underlay network, and then logically divide up the resources of that NE within the centralized control plane 476 to present different VNEs in the virtual network(s) 492 (where these different VNEs in the overlay networks are sharing the resources of the single VNE/NE implementation on the ND in the underlay network).

Figure 4E:
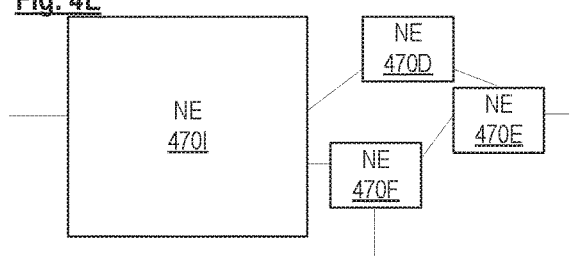
FIG. 4E illustrates the simple case of where each of the NDs implements a single NE, but a centralized control plane has abstracted multiple of the NEs in different NDs into (to represent) a single NE in one of the virtual network(s), according to some embodiments.
Figure 4F:
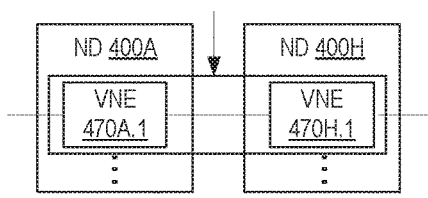
FIG. 4F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 4E and 4F respectively illustrate exemplary abstractions of NEs and VNEs that the network controller 478 may present as part of different ones of the virtual networks 492. FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 4701 in one of the virtual network(s) 492 of FIG. 4D, according to some embodiments of the invention. FIG. 4E shows that in this virtual network, the NE 4701 is coupled to NE 470D and 470F, which are both still coupled to NE 470E.

FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention. Thus, the abstraction of a NE or VNE can span multiple NDs.

While some embodiments of the invention implement the centralized control plane 476 as a single entity (e.g., a single instance of software running on a single electronic device), alternative embodiments may spread the functionality across multiple entities for redundancy and/or scalability purposes (e.g., multiple instances of software running on different electronic devices).

Figure 5:
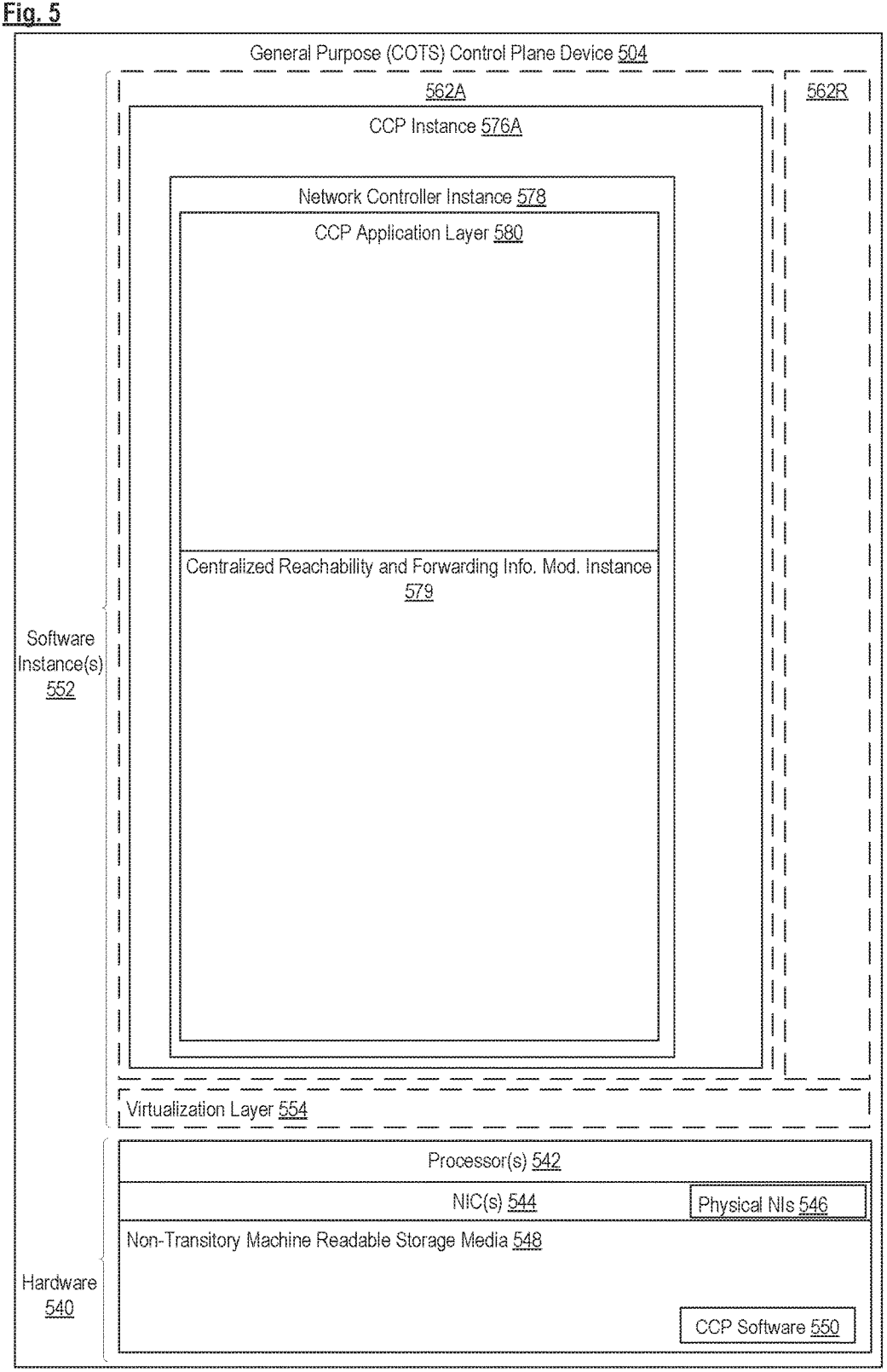
FIG. 5 illustrates a general purpose control plane device with centralized control plane (CCP) software, according to some embodiments.

Similar to the network device implementations, the electronic device(s) running the centralized control plane 476, and thus the network controller 478 including the centralized reachability and forwarding information module 479, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 5 illustrates, a general purpose control plane device 504 including hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein centralized control plane (CCP) software 550.

In embodiments that use compute virtualization, the processor(s) 542 typically execute software to instantiate a virtualization layer 554 (e.g., in one embodiment the virtualization layer 554 represents the kernel of an operating system (or a shim executing on a base operating system) that allows for the creation of multiple instances 562A-R called software containers (representing separate user spaces and also called virtualization engines, virtual private servers, or jails) that may each be used to execute a set of one or more applications; in another embodiment the virtualization layer 554 represents a hypervisor (sometimes referred to as a virtual machine monitor (WM)) or a hypervisor executing on top of a host operating system, and an application is run on top of a guest operating system within an instance 562A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 540, directly on a hypervisor represented by virtualization layer 554 (in which case the unikernel is sometimes described as running within a LibOS virtual machine), or in a software container represented by one of instances 562A-R). Again, in embodiments where compute virtualization is used, during operation an instance of the CCP software 550 (illustrated as CCP instance 576A) is executed (e.g., within the instance 562A) on the virtualization layer 554. In embodiments where compute virtualization is not used, the CCP instance 576A is executed, as a unikernel or on top of a host operating system, on the "bare metal" general purpose control plane device 504. The instantiation of the CCP instance 576A, as well as the virtualization layer 554 and instances 562A-R if implemented, are collectively referred to as software instance(s) 552.

In some embodiments, the CCP instance 576A includes a network controller instance 578. The network controller instance 578 includes a centralized reachability and forwarding information module instance 579 (which is a middleware layer providing the context of the network controller 478 to the operating system and communicating with the various NEs), and an CCP application layer 580 (sometimes referred to as an application layer) over the middleware layer (providing the intelligence required for various network operations such as protocols, network situational awareness, and user-interfaces). At a more abstract level, this CCP application layer 580 within the centralized control plane 476 works with virtual network view(s) (logical view(s) of the network) and the middleware layer provides the conversion from the virtual networks to the physical view.

The centralized control plane 476 transmits relevant messages to the data plane 480 based on CCP application layer 580 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 480 may receive different messages, and thus different forwarding information. The data plane 480 processes these messages and programs the appropriate flow information and corresponding actions in the forwarding tables (sometimes referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, forward the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 480, the packet (or a subset of the packet header and content) is typically forwarded to the centralized control plane 476. The centralized control plane 476 will then program forwarding table entries into the data plane 480 to accommodate packets belonging to the flow of the unknown packet. Once a specific forwarding table entry has been programmed into the data plane 480 by the centralized control plane 476, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments of the present invention have been presented through flow diagrams. It will be appreciated that the order of transactions and transactions described in these flow diagrams are only intended for illustrative purposes and not intended as a limitation of the present invention.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method implemented by a network device to dynamically optimize lookup speed in a packet processing table maintained at the network device while the network device is in operation, the method comprising:
    determining one or more runtime metrics of the packet processing table, wherein the one or more runtime metrics are metrics of the packet processing table obtained while the network device is in operation;
    selecting a lookup algorithm for the packet processing table from a set of lookup algorithms supported by the network device based on the one or more runtime metrics of the packet processing table; and
    configuring, while the network device is in operation, the network device to start matching incoming packets against rules in the packet processing table using the selected lookup algorithm for the packet processing table instead of using a current lookup algorithm for the packet processing table.

2. The method of claim 1, further comprising:
    receiving a packet; and
    matching the packet against the rules in the packet processing table using the selected lookup algorithm for the packet processing table.

3. The method of claim 1, wherein determining the one or more runtime metrics of the packet processing table is in response to a determination that a rule is to be added to the packet processing table.

4. The method of claim 1, wherein the one or more runtime metrics of the packet processing table include a number of rules in the packet processing table or a syntax of rules in the packet processing table.

5. The method of claim 1, wherein the set of lookup algorithms supported by the network device includes an inline lookup algorithm, and wherein the network device selects the inline lookup algorithm as the lookup algorithm for the packet processing table in response to a determination that a number of rules in the packet processing table is less than a threshold value.

6. The method of claim 5, further comprising:
    dynamically generating lookup code for the packet processing table, wherein information regarding a match field of a rule in the packet processing table is embedded in the dynamically generated lookup code.

7. The method of claim 1, wherein the set of lookup algorithms supported by the network device further includes a linear search lookup algorithm, and wherein the network device selects the linear search lookup algorithm as the lookup algorithm for the packet processing table in response to a determination that a number of rules in the packet processing table is larger than or equal to a first threshold value and less than a second threshold value.

8. The method of claim 1, wherein the set of lookup algorithms supported by the network device includes a perfect hash lookup algorithm, and wherein the network device selects the perfect hash lookup algorithm as the lookup algorithm for the packet processing table in response to a determination that all rules in the packet processing table have a same type of key and a same mask and that a computationally efficient perfect hash function for the rules in the packet processing table can be generated, wherein a perfect hash function is computationally efficient if meets or exceeds a predetermined level of computational efficiency.

9. The method of claim 1, wherein the set of lookup algorithms supported by the network device includes a generic hash lookup algorithm, and wherein the network device selects the generic hash lookup algorithm as the lookup algorithm for the packet processing table in response to a determination that all rules in the packet processing table have a same type of key and a same mask and that a computationally efficient perfect hash function for the rules in the packet processing table cannot be generated, wherein a perfect hash function is computationally efficient if meets or exceeds a predetermined level of computational efficiency.

10. The method of claim 1, wherein the set of lookup algorithms supported by the network device includes a tree-based lookup algorithm, and wherein the network device selects the tree-based lookup algorithm as the lookup algorithm for the packet processing table in response to a determination that all rules in the packet processing table have a same type of key and a mask in a form of 1*0* and that rule priority in the packet processing table is determined based on a number of leading one bits in a mask of a rule.

11. The method of claim 1, further comprising:
    determining that the one or more runtime metrics of the packet processing table do not meet a selection criteria of any lookup algorithms from the set of lookup algorithms supported by the network device; and
    selecting a lookup algorithm designated as a default lookup algorithm from the set of lookup algorithms supported by the network device as the lookup algorithm for the packet processing table in response to a determination that the one or more runtime metrics of the packet processing table do not meet the selection criteria of any lookup algorithms from the set of lookup algorithms supported by the network device.

12. The method of claim 1, further comprising:
    determining one or more runtime metrics of a second packet processing table maintained at the network device;
    selecting a lookup algorithm for the second packet processing table from the set of lookup algorithms supported by the network device based on the one or more runtime metrics of the second packet processing table; and configuring the network device to match incoming packets against rules in the second packet processing table using the selected lookup algorithm for the second packet processing table.

13. A network device configured to dynamically optimize lookup speed in a packet processing table maintained at the network device while the network device is in operation, the network device comprising:

a set of one or more processors; and a non-transitory machine-readable storage medium having stored therein a lookup optimization module, which when executed by the set of one or more processors, causes the network device to determine one or more runtime metrics of the packet processing table, wherein the one or more runtime metrics are metrics of the packet processing table obtained while the network device is in operation, select a lookup algorithm for the packet processing table from a set of lookup algorithms supported by the network device based on the one or more runtime metrics of the packet processing table, and configure, while the network device is in operation, the network device to start matching incoming packets against rules in the packet processing table using the selected lookup algorithm for the packet processing table instead of using a current lookup algorithm for the packet processing table.

14. The network device of claim 13, wherein the lookup optimization module, when executed by the set of one or more processors, further causes the network device to receive a packet and match the packet against the rules in the packet processing table using the selected lookup algorithm for the packet processing table.

15. The network device of claim 13, wherein the one or more runtime metrics of the packet processing table include a number of rules in the packet processing table or a syntax of rules in the packet processing table.

16. The network device of claim 13, wherein the lookup optimization module, when executed by the set of one or more processors, further causes the network device to determine one or more runtime metrics of a second packet processing table maintained at the network device, select a lookup algorithm for the second packet processing table from the set of lookup algorithms supported by the network device based on the one or more runtime metrics of the second packet processing table, and configure the network device to match incoming packets against rules in the second packet processing table using the selected lookup algorithm for the second packet processing table.

17. A non-transitory machine-readable medium having computer code stored therein, which when executed by a set of one or more processors of a network device, causes the network device to perform operations for dynamically optimizing lookup speed in a packet processing table maintained at the network device while the network device is in operation, the operations comprising:

determining one or more runtime metrics of the packet processing table, wherein the one or more runtime metrics are metrics of the packet processing table obtained while the network device is in operation;

selecting a lookup algorithm for the packet processing table from a set of lookup algorithms supported by the network device based on the one or more runtime metrics of the packet processing table; and configuring, while the network device is in operation, the network device to start matching incoming packets against rules in the packet processing table using the selected lookup algorithm for the packet processing table instead of using a current lookup algorithm for the packet processing table.

18. The non-transitory machine-readable medium of claim 17, wherein the computer code, when executed by the set of one or more processors of the network device, causes the network device to perform further operations comprising:

receiving a packet; and matching the packet against the rules in the packet processing table using the selected lookup algorithm for the packet processing table.

19. The non-transitory machine-readable medium of claim 17, wherein the set of lookup algorithms supported by the network device includes an inline lookup algorithm, and wherein the network device selects the inline lookup algorithm as the lookup algorithm for the packet processing table in response to a determination that a number of rules in the packet processing table is less than a threshold value.

20. The non-transitory machine-readable medium of claim 18, wherein the computer code, when executed by the set of one or more processors of the network device, causes the network device to perform further operations comprising:

dynamically generating lookup code for the packet processing table, wherein information regarding a match field of a rule in the packet processing table is embedded in the dynamically generated lookup code.

* * * * *